Figure 1:
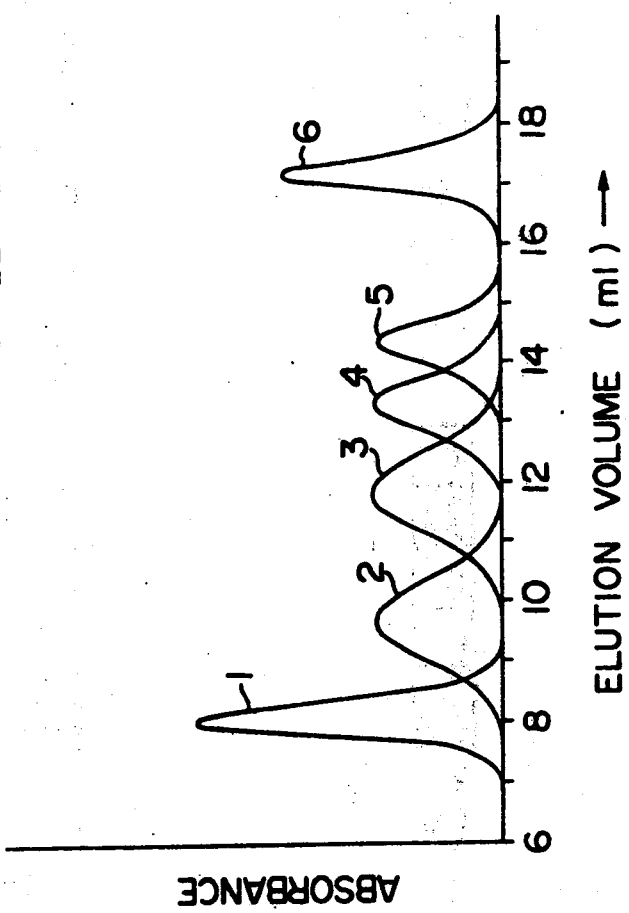

United States Patent [19]

Ishiguro et al.

[11] 4,118,347

[45] Oct. 3, 1978

[54] FILLER FOR LIQUID CHROMATOGRAPHY

[75] Inventors: Susumu Ishiguro; Masuhiro Komuro; Shigeru Nakamura, all of Yokohama, Japan

[73] Assignee: Showa Denko K.K., Japan

[21] Appl. No.: 806,842

[22] Filed: Jun. 15, 1977

[30] Foreign Application Priority Data

Jun. 25, 1976 [JP] Japan .................................. 51-74401

[51] Int. Cl.$^2$ ........................... C08J 9/16; C08J 9/20; C08J 9/36
[52] U.S. Cl. ...................................... 521/53; 521/149; 210/31 C; 260/2.5 EP; 544/274; 260/343.7; 260/297.5; 526/16; 526/53; 526/54; 526/273; 528/482; 536/112
[58] Field of Search ........... 260/2.5 EP, 2.5 R, 2.1 E, 260/2.1 R; 526/273

[56] References Cited

U.S. PATENT DOCUMENTS

| | | | |
|---|---|---|---|
| 2,630,429 | 3/1953 | Hwa | 260/2.1 E |
| 3,228,920 | 1/1966 | D'Alelio | 260/2.1 E |
| 3,312,677 | 4/1967 | Rosen | 526/273 |
| 3,418,262 | 12/1968 | Werotte et al. | 260/2.1 E |
| 4,031,037 | 6/1977 | Kalal et al. | 260/2.2 R |

*Primary Examiner*—Stanford M. Levin
*Attorney, Agent, or Firm*—Fitzpatrick, Cella, Harper & Scinto

[57] ABSTRACT

A granular filler for liquid chromatography consisting essentially of a porous copolymer of (A) a glycidyl monovinyl ester of glycidyl monovinyl ether and (B) an alkylene glycol divinyl ester with component (A) being crosslinked by component (B) to form a gel copolymer, said copolymer containing in its molecule epoxy groups ascribable to component (A) or modified groups resulting from the ring-opening reaction of the epoxy groups with a modifying compound having a hydrophilic, oleophilic or ion exchangeable group.

12 Claims, 9 Drawing Figures

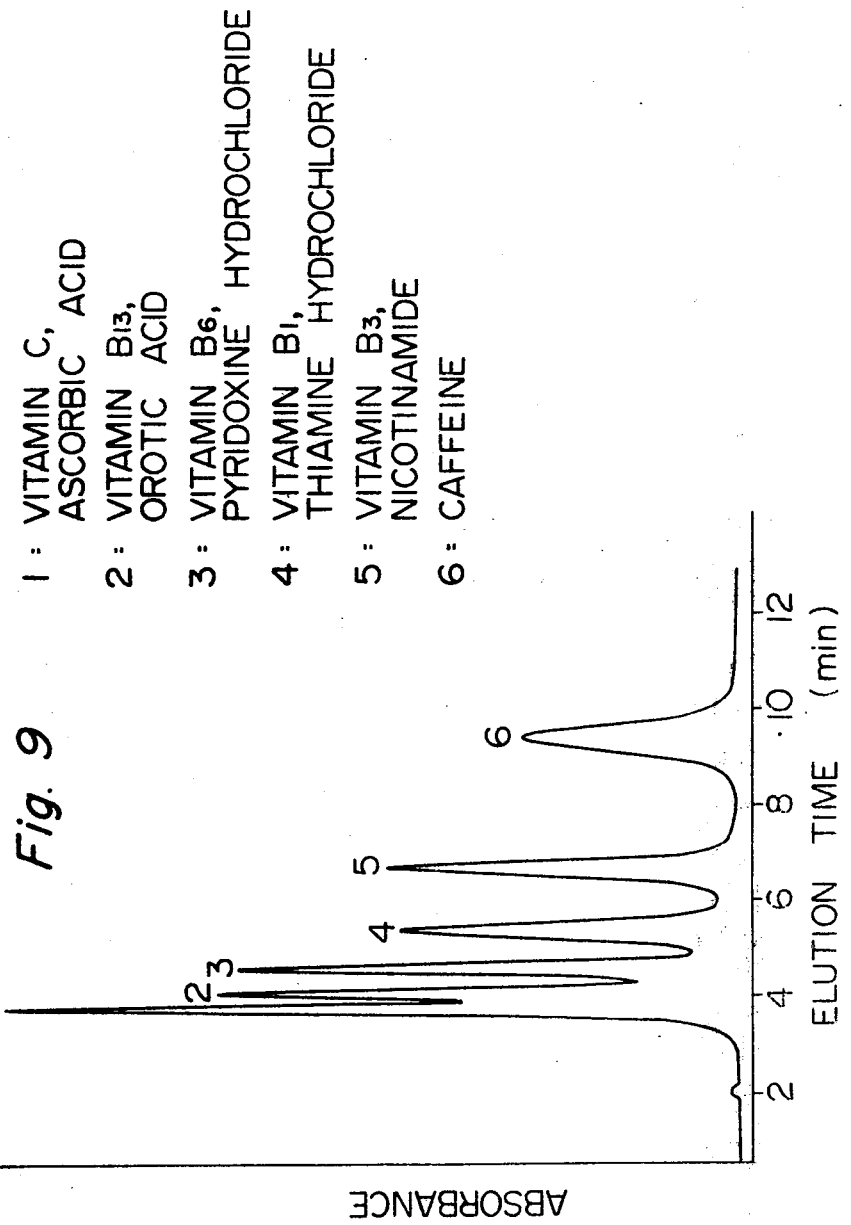

FILLER FOR LIQUID CHROMATOGRAPHY

This invention relates to a novel granular filler for liquid chromatography. More specifically, the invention relates to a filler for liquid chromatography which consists essentially of a porous copolymer which is a gel-like copolymer composed of (A) a glycidyl monovinyl ester or glycidyl monovinyl ether and (B) an alkylene glycol divinyl ester as main components with component (A) being crosslinked by component (B) and containing in the molecule free epoxy groups ascribable to component (A) or modified groups resulting from the modification of the epoxy groups by ring-opening reaction, and to a process for its preparation.

Liquid chromatography can be classified into gel chromatography, adsorption chromatography, partition chromatography and ion exchange chromatography according to the mechanism of separating components. The present invention provides a novel filler to be packed in a column in these various types of chromatography.

The main characteristic features of the chromatographic filler of this invention are that it contains free epoxy groups or groups resulting from their modification by ring-opening reaction in its molecules; and that it can be used both in an organic medium and in an aqueous medium, has high mechanical strength, and is easy to produce. No chromatographic filler having these features together has been known previously.

Typical cross-linked polymers used heretofore as liquid chromatographic fillers, especially as gel chromatographic fillers, include (a) polystyrene crosslinked with divinylbenzene, (b) polymethacrylate crosslinked with ethylene glycol dimethacrylate, (c) polyacrylamide gel crosslinked with methylene-bis-acrylamide, (d) polyvinyl alcohol gel crosslinked with glycidyl methacrylate, (e) a gel obtained by polymerizing polyethylene glycol dimethacrylate, (f) dextran gel crosslinked with epichlorohydrin, and (g) β-hydroxyethyl methacrylate gel crosslinked with ethylene glycol dimethacrylate. Polymers (a) and (b) are used as chromatographic fillers in an organic medium, and polymers (c) to (g), in an aqueous medium. Of polymers (c) to (g), polymers (e) and (g) have a relatively high mechanical strength, but the others have low mechanical strength.

When a substance with large molecules is to be separated by gel chromatography in an aqueous medium, the degree of crosslinkage of a copolymeric filler should be reduced to widen the meshes of its network structure. As a result, the gel-like copolymers (c), (d) and (f) are soft and mechanically weak. Thus, although these fillers can be used when an eluant is caused to flow spontaneously so as not to exert pressures thereon, these copolymeric fillers would be distorted by pressure and become useless when the eluant is passed at a fast rate by means of a pump.

In view of the ease of production, bead-like chromatographic fillers are preferably used, and such fillers are generally produced by a suspension-polymerization method. However, when the monomer component of a copolymer has strong hydrophilicity as in polymers (c) and (g), it is impossible to perform suspension polymerization by a simple aqueous suspension method. If the suspension polymerization is to be used in any case, it must be performed by a water-in-oil suspension method which is troublesome to operate or control.

It is an object of this invention to provide a granular filler for liquid chromatography which consists of a porous gel-like copolymer which has high mechanical strength, can be used both in an organic medium and in an aqueous medium, and can be produced by a simple aqueous suspension method. Another object of the invention is to provide a filler in which the copolymer is modified so as to conform to a given type of chromatography and a given test sample.

The scope and general features of the invention are first described below.

It has been found that a gel-like copolymer suitable as a filler meeting the above objects can be produced by the aqueous suspension polymerization of (A) a glycidyl monovinyl ester or a glycidyl monovinyl ether and (B) an alkylene glycol divinyl ester in the presence of a water-insoluble organic diluent.

Since the components (A) and (B) are difficultly soluble in water, they can be copolymerized by an aqueous suspension polymerization method. In other words, the aqueous suspension polymerication is performed by a simple oil-in-water suspension method. According to the present invention, the aqueous suspension copolymerization is carried out in the presence of an organic diluent, and bacause of the presence of the organic diluent, the alkylene glycol divinyl ester (B) acts as a main crosslinking component whereupon most of the epoxy groups in the glycidyl monovinyl monomer (A) remain in the resulting copolymer without being ring-opened. In some of the conventional fillers described above, the glycidyl monovinyl monomer is used as one component of polymer, but it acts as a crosslinking component. Copolymer (d) cited above is such an example. In other words, by copolymerization in the absence of an organic diluent, the glycidyl monomer component acts as a crosslinking component with the ring-opening of its epoxy groups, and therefore, the resulting copolymer contains no free epoxy group.

The chromatographic filler of this invention is especially characteristic in that it consists of a gel-like copolymer of components (A) and (B) and contains in its molecules free epoxy groups based on component (A). This gel-like copolymer is suitable as a chromatographic filler used in an aqueous medium because the epoxy groups have affinity for water. This copolymer can also be used as a chromatographic filler in an organic medium.

The organic diluent present during the polymerization serves not only to prevent the ring-opening of the epoxy groups of component (A), but also to adjust the pore sizes of the resulting porous gel-like copolymer. It also prevents the reduction of the mechanical strength of copolymers having a large pore size.

If it is desired to produce a porous gel having a large pore size by crosslinking copolymerization in the absence of an organic diluent, it is necessary to decrease the amount of the crosslinking component and thus to reduce the degree of crosslinkage. If the degree of crosslinkage is small, the mechanical strength of the resulting gel naturally decreases. In contrast, in aqueous suspension polymerization in the presence of an organic diluent, phase separation between the resulting polymer and the organic diluent occurs in the suspended particles as the polymerisation proceeds, and a gel having a large pore size can be formed. Hence, even when the crosslinking component is used in a relatively large amount, the pore size of the resulting gel does not become small, and the gel has high mechanical strength.

The technique for using an organic diluent for pore size adjustment has been known, but it has not been known to use organic diluents for the purpose of causing free epoxy groups to remain in the resulting copolymer and thus obtaining a gel which is useful as a chromatographic filler in an organic medium and an aqueous medium and has high mechanical strength. The orgain diluents used and their effects will be described in more detail hereinbelow.

The epoxy-containing gel-like copolymer described above is especially useful as a gel chromatographic filler. By modifying the epoxy groups, the properties of the gel can be further improved, or it can be rendered adaptable as a filler for other types of liquid chromatography, i.e., adsorption chromatography, partition chromatography, and ion exchange chromatography as well. The present invention is very characteristic in this regard, too. Since the epoxy groups have relatively good reactivity and react with various active hydrogen-containing compounds and reactive compounds, various functional groups can be introduced into the copolymer to modify the properties of the copolymer. For example, the epoxy groups can be hydrolyzed to 1,2-dihydroxyethyl groups, which results in markedly enhanced hydrophilicity, and affords a gel which is better as a gel chromatographic filler for use in an aqueous medium. The functional groups that can be introduced include hydrophilic groups, oleophilic groups and groups having ion exchange capacity. These functional groups and methods for their intorduction will be described in detail elsewhere.

The present invention thus embraces a chromatographic filler consisting of an epoxy-containing gel-like copolymer composed of components (A) and (B), a chromatographic filler consisting of the gel-like copolymer in which the epoxy groups have been modified by ring-opening reaction, and processes for producing these fillers.

Some preferred embodiments of the present invention are described below.

First, the description will be directed to the epoxy-containing gel-like copolymer and a process for its preparation.

Component (A) for producing the gel-like copolymer which constitutes the chromatographic filler of this invention is a glycidyl monovinyl ester or a glycidyl monovinyl ether, and glycidyl esters of monovinylcarboxylic acids containing 3 to 12 carbon atoms, and glycidyl ethers of monovinylalcohols containing 3 to 12 carbon atoms are used. Those having less carbon atoms are especially preferred. Examples thereof include glycidyl methacrylate, glycidyl acrylate, and allylglycidyl ether.

Compnent (B) acting as a crosslinking component is an alkylene glycol divinyl ester, preferably esters formed between alkylene glycols containing 2 to 3 carbon atoms or their polymers and acrylic or methacrylic acid. Examples of such esters are alkylene glycol divinyl esters such as ethylene glycol diacrylate, ethylene glycol dimethacrylate, propylene glycol diacrylate or propylene glycol dimethacrylate, and polyalkylene glycol divinyl esters such as polyethylene glycol dimethacrylate or polypropylene glycol dimethacrylate. Preferably, the polyalkylene glycols have a degree of polymerization of not more than 4.

The gel-like copolymer comprises 10 to 90 mole%, preferably 40 to 80 mole%, of component (A) and 90 to 10 mole%, preferably 60 to 20 mole%, of component (B). Not more than 50 mole% of component (A) may be replaced by another lower vinyl ester such as methyl methacrylate, methyl acrylate or vinyl acetate. The content of epoxy groups in the copolymer naturally increases with increasing proportion of component (A). The degree of crosslinkage of the copolymer increases with increasing proportion of component (B), and therefore, the network structure of the copolymer is denser, and the copolymer has a lower degree of swelling and becomes harder. If the proportions of these components are outside the specified ranges, it is impossible to obtain gel-like copolymers which have the desired features and properties.

Component (A) and (B) are subjected to aqueous suspension polymerization in the presence of a water-insoluble organic diluent to form the desired bead-like gel copolymer. The components (A) and (B) are dissolved in the organic diluent, and subjected to oil-in-water type suspension polymerization. The presence of the organic diluent inhibits the ring-opening of the epoxy groups in component (A) and its subsequent crosslinking, and thus, the epoxy groups are retained in the resulting polymer. In the absence of an organic diluent, the epoxy groups are ring-opened. This induces crosslinkage and very much complicates the polymerization reaction, and the desired product cannot be obtained.

The organic diluent should be inert to the polymerization reaction and insoluble or only slightly soluble in water but should dissolve the starting monomers. The amount of the organic diluent is at least 30% by volume, preferably 40 to 80% by volume, based on the total amount of the monomers and the organic diluent. Larger amounts result in greater inhibition of the ring-opening of the epoxy groups in the polymerization process. Generally, 60 to 95% of the epoxy groups in the component (A) charged can be easily left in the resulting copolymer. The remainder of the epoxy groups are considered to undergo hydrolysis during the polymerization.

The epoxy content of the resulting gel can be adjusted by the amount of component (A) used (that is, the ratio of component (A) to component (B) or the partial replacement of component (A) by a comonomer). Preferably, the epoxy groups remain in the resulting copolymer in an amount, calculated as epoxy oxygen, of at least 0.5% by weight, and up to about 10% by weight, based on the weight of the copolymer.

The use of the organic diluent at the time of aqueous suspension polymerization also serves to adjust the pore size of the resulting porous gel. If an organic diluent having a low ability to swell the resulting gel is used, phase separation occurs in the suspended particles during the polymerization, and the separated organic diluent layer leads to the formation of pores. As a result, a gel having a macroporous structure can be obtained. If, on the other hand, a diluent having a great ability to swell the gel is used, the polymerization proceeds while the resulting product is in the swollen stage. Thus, phase separation does not appreciably occur, and a polymer having a relatively small pore size is obtained. The effect of the organic diluent on the pore size has previously been known with regard to other gels, and this knowledge can be equally applied to the gel of the present ivention composed of components (A) and (B). The degree of swelling property can be determined on the basis of the solubility parameter of the organic diluent.

Examples of suitable organic diluents that can be used in the present invention, in order of decreasing degree of the ability to swell the resulting gel, are cyclohexanone, chrolobenzene, benzene, toluene, n-propyl acetate, n-butyl acetate, dibutyl ether, n-heptyl alcohol, n-octyl alcohol, and n-octane.

The aqueous suspension polymerization can be performed in a known manner in the presence of a free radical generating catalyst such as azobisisobutyronitrile or benzoyl peroxide. The amount of the aqueous layer is substantially the same as the volume of the organic layer, and may be up to about 10 times the volume of the organic layer although it is not particularly critical. The polymerization temperature, which varies according to the catalyst used, is about 50° to 100° C. The gel-like copolymer can be obtained as granules suitable for chromatographic fillers.

According to the present invention, the use of water-insoluble organic diluents at the time of aqueous suspension polymerization makes it possible to leave epoxy groups ascribable to component (A) in the resulting gel, and to afford a chromatographic filler which has hydrophilicity and a controlled pore size and even when the pore size is large, has high mechanical strength. Generally, gels having a medium degree of pore size, for example, a pore size of 50 to 500 Å, are suitable as adsorption chromatographic fillers. For use as gel chromatographic fillers, the pore size is adjusted to a suitable value, for example, 10 to 1000 Å according to the size of the molecules of a sample to be separated.

Now, the chromatographic filler in which the epoxy groups have been modified by ring-opening and a process for its production will be described.

According to the present invention, fillers having improved properties and being suitable for various types of chromatography can be obtained by treating the epoxy-containing gel-like copolymer described above with a modifier, especially a compound having active hydrogen, thereby to ring-open the epoxy groups, namely to introduce functional groups into the sites of the epoxy groups thus ring-opened. Since the epoxy groups are very reactive, the modification treatment can be carried out relatively easily.

The modification of an epoxy group by ring-opening reaction is schematically shown as follows:

(I)

wherein X-Y is a modifier, X is a reactive atom such as active hydrogen and Y is a functional group. Examples of Y are hydrophilic groups such as a residue of water —OH, a residue of an alkylene glycol or polyalkylene glycol —OROH (wherein R is an alkylene group or polyalkylene ether group), or a residue of a triol —OR(OH)$_2$; oleophilic groups such as a residue of a carboxylic acid —OCOR (wherein R is an alkyl group); and groups having ion exchange ability (ion exchangeable groups) such as a sulfonic acid group —SO$_3$H or a dialkylamino group —NR$_2$ (wherein R is an alkyl group).

When an epoxy-containing gel-like copolymer is treated with water as a modifier, the epoxy groups are ring-opened by hydrolysis and thus converted to 1,2-dihydroxyethyl groups. The hydrolysis can be performed easily by heating the gel-like copolymer to a temperature lower than 100° C. in water in the presence of an acid or alkali, preferably sulfuric acid. The resulting gel has enhanced hydrophilicity owing to the 1,2-dihydroxyethyl groups, and exhibits superior properties as a filler for gel chromatography in an aqueous medium to the copolymer before modification. For Example, in the separation of polyethylene glycol as a sample by gel chromatography in an aqueous medium, the gel copolymer before modification induces adsorption of polyethylene glycol having a large moleculAr weight of, say, more than 1,000, whereas the modified gel copolymer does not cause such adsorption. Hence, the modified gel-like copolymer permits better separation of polyethylene glycol by gel chromatography (separation according to the size of molecules). The modified filler can be suitably applied to the gel chromatographic separation of dextran, proteins, enzymes and oligopeptides. This gel has better mechanical strength and higher resistance to bacteria and fungi than the conventional hydrophilic gels cited earlier in the specification, for example the polyamide gel (c) or the dextran gel (f).

When an alkylene glycol, a polyalkylene glycol or a triol is used as a modifier instead of water, ring-opening of the epoxy groups and addition of such a compound are also effected as shown by formula (I), and as a result, modified copolymers having the corresponding hydrophilic groups can be obtained. The ring-opening and addition reaction of the epoxy-containing copolymer with such a polyol modifier can be easily performed in the presence of a boron trifluoride catalyst. A similar reaction is known for example in a reaction of adding polyethylene glycol to a long-chain epoxy alkane in the production of a nonionic surface-active agent (see, for example, U.S. Pat. No. 3,240,819). The reaction in this invention can be carried out in the same manner as in the known reaction. The gel-like copolymer so modified has enhanced hydrophilicity owing to the hydrophilic groups added, and can be suitably applied as a filler for liquid chromatography in aqueous media.

When monocarboxylic acids are used as the modifier, the carboxylic acid adds simultaneously with the ring-opening of the epoxy groups, and modified copolymers having the corresponding oleophilic carboxylic acid residues introduced therein can be obtained. Preferred monocarboxylic acids are those containing 4 to 20 carbon atoms. One example of the reaction between a monocarboxylic acid and an epoxy-containing copolymer comprises mixing the epoxy-containing gel copolymer with caprylic acid, and heating the mixture at 125° C. for 9 hours in the presence of a 0.6% dipropylene glycol solution of benzyltrimethylammonium hydroxide as a catalyst. (A similar reaction is disclosed in Ind. Eng. Chem. Vol. 48, No. 1, pages 86–92 (1956)).

When sodium hydrogen sulfite or sodium sulfite is used as the modifier, a modifier gel copolymer having a sulfonic acid group introduced simultaneously with the ring-opening of the epoxy groups can be obtained. The resulting gel copolymer has cation exchange ability because of the sulfonic acid group present in it, and is useful as a filler for cation exchange chromatography. Introduction of a sulfonic acid group can be effected by heating the epoxy-containing copolymer in an aquoues acetone solution of sodium hydrogen sulfite or sodium sulfite.

The use of a dialkylamine, for example a secondary amine such as diethylamine, diproplyamine or dibutylamine as the modifier affords a modified gel copolymer having a group containing the corresponding tertiary amino nitrogen introduced therein. The gel copolymer has anion exchange ability because of its tertiary amino nitrogen, and can be suitably used as a filler for anion exchange chromatography. The reaction of the epoxy-containing copolymer with the secondary amine is carried out easily by heating the reactants in an aqueous medium to about 50° C. to 100° C.

Specific examples of the modifier and the functional group introduced into the gel copolymer have been given above. But the invention is not limited to these examples, and as needed, copolymers having other functional groups introduced therein can be furnished.

The following Examples illustrate the present invention more specifically.

The accompanying drawings are chromatograms obtained by using the gel copolymer fillers of this invention, and infrared absorption spectral charts of the gel copolymers. The drawings will be specifically described in the following Examples.

EXAMPLE 1

A mixture consisting of 30 g of glycidyl methacrylate as component (A), 30 g of ethylene glycol dimethacrylate as component (B), 90 g of n-butyl acetate as an organic diluent, and 0.3 of azobisisobutyronitrile as a catalyst was suspended in a solution of 1.5 g of polyvinyl alcohol (dispersant) in 1 liter of water. With stirring, the mixture was heated at 60° C. for 6 hours to perform oil-in-water type suspension polymerization. The reaction mixture was cooled to room temperature, and the resulting granular gel copolymer was collected by filtration. The copolymer was washed with water several times, washed with acetone, and dried. The content of the epoxy groups in the polymer was determined by the hydrochloric acid-dimethylformamide method, and was found to be 3.9% by weight calculated as epoxy oxygen which corresponded to 70% of theory based on the amount of component (A) charged.

The polymer was sieved, Gel particles having a size of 44 to 75 microns were collected and packed into stainless steel column having an inside diameter of 8 mm and a length of 500 mm. Using this column, 0.05solutions of polystryrenes having different molecular weights were separated. The separation was performed using tetrahydrofuran as an eluant at room temperature at flow rate of 1 ml/min. FIG. 1 is a chromatogram showing the results, in which the axis of abscissas represent the elution volume and the axis of ordinates, the absorbance. The parenthesized numerals show the molecular weights of the polystyrene samples. In FIG. 1, benzene was used in order to know the total permeation limit, namely the position at which a substance having the lowest molecular weight would appear.

The gel obtained in this Example had an exclusion limit (the upper limit of molecular weight that can be analyzed) for polystyrene of $6 \times 10^5$ in tetrahydrofuran, and a swelling ratio in tetrahydrofuran of 4.9 ml/g.

EXAMPLE 2

Figure 2:
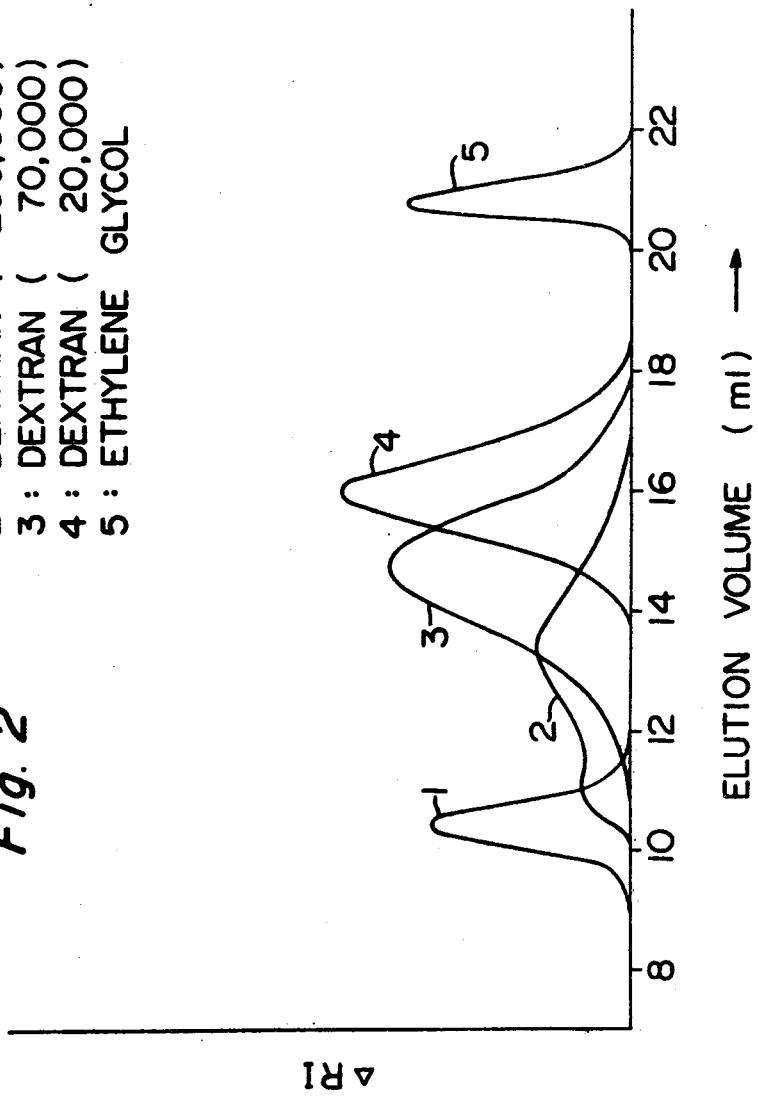

Gel chromatography of dextran was performed in an aqueous medium using the same filler and apparatus as used in Example 1. Specifically, 0.5 ml each of 0.05% solutions of dextrans having different molecular weights were passed through the column. Pure water was used as an eluant. The flow rate was 1 ml/minute, and the temperature was room temperature. The eluted ingredients were detected by using a differential refractometer. The chromatogram obtained is shown in FIG. 2. The axis of abscissas represents the elution volume, and the axis of ordinates represents the difference of refractive index, $\Delta RI$. The parenthesized numerals represent the weight average molecular weights of the dextran specimens used. Ethylene glycol was used to know the total permeation limit. The gel obtained in this Example had an exclusion limit for dextran of $1 \times 10^6$, and a swelling ratio in water of 4.7 ml/g.

EXAMPLE 3

A mixture consisting of 43.5 g of allyl glycidyl ether, 16.5 g of ethylene glycol dimethacrylate, 82 g of monochlorobenzene and 0.3 g of azobisisobutyronitrile was suspension-polymerized in water under the same conditions as described in Example 1. The resulting copolymer was washed, and dried. A transparent bead-like epoxy-containing gel copolymer was obtained.

EXAMPLE 4

A mixture consisting of 45 g of glycidyl metharylate, 15 g of ethylene glycol dimethacrylate, 65 g of chlorobenzene and 0.3 g of azobisisobutyronitrile was subjected to aqueous suspension polymerization in the same way as in Example 1. The resulting copolymer was washed, and dried. A microscopic examination showed that the resulting gel particles were semi-transparent and somewhat opalescent. The gel copolymer had an exclusion limit for polystyrene of $2 \times 10^5$ in tetrahydrofuran, and the amount of the remaining epoxy groups was 6.5% by weight calculated as epoxy oxygen which corresponded to 77% of theory based on the amount of component (A) charged.

EXAMPLE 5

A mixture consisting of 45 g of glycidyl methacrylate, 15 g of ethylene glycol dimethacrylate, 84 g of cyclohexanone and 0.3 g of azobisisobutyronitrile was subjected to aqueous suspension polymerization in the same way as in Example 1. The resulting copolymer was washed, and dried to form gel particles which were transparent beads. The amount of the remaining epoxy groups was 6.1% by weight calculated as epoxy oxygen which corresponded to 72% of the amount of component (A) charged.

Figure 3:
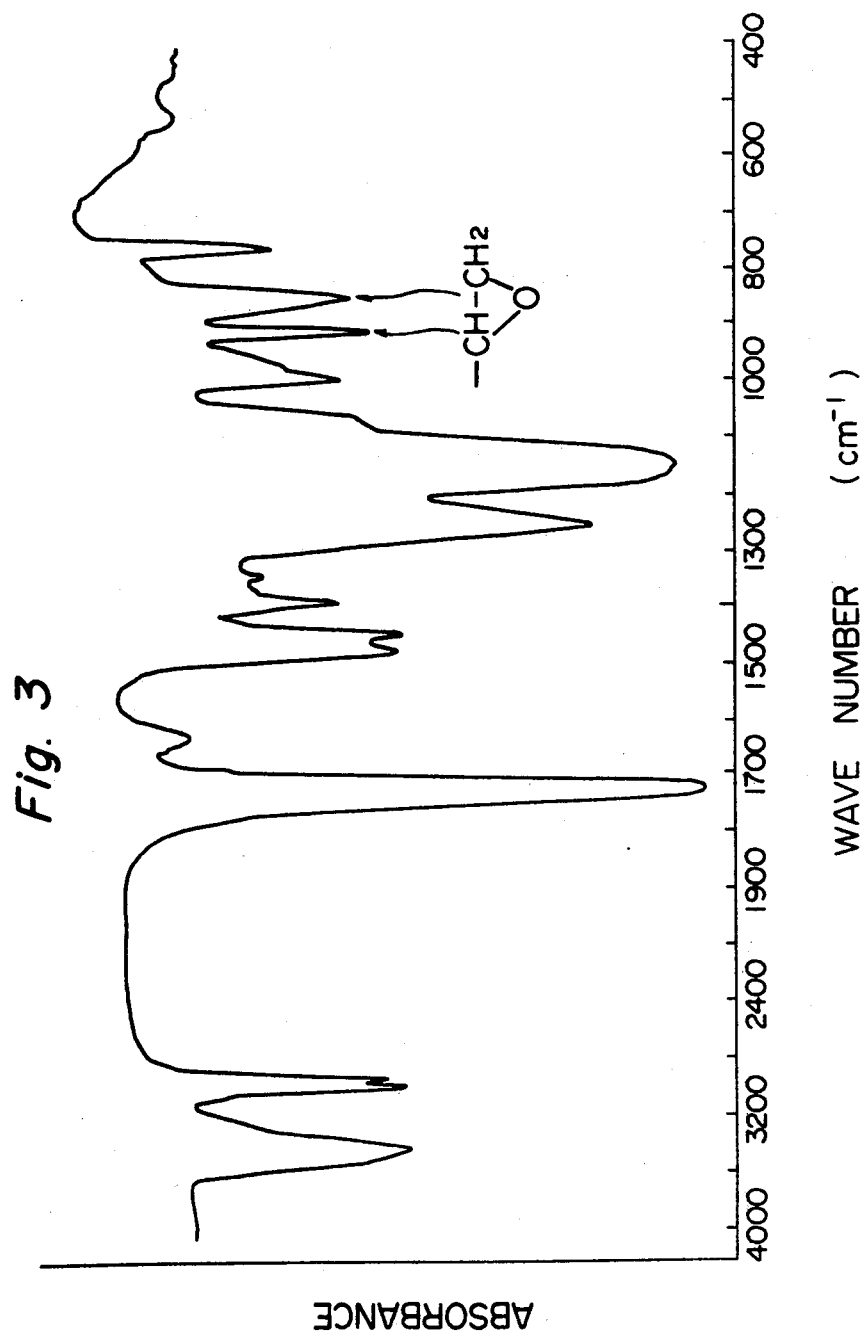

The infrared absorption spectrum of the gel copolymer obtained in this Example is shown in FIG. 3. The two absorption bands at 910 cm$^{-1}$ and 840 cm$^{-1}$ in FIG. 3 correspond to an absorption band of an oxirane ring, and apparently show the presence of epoxy groups.

Figure 4:
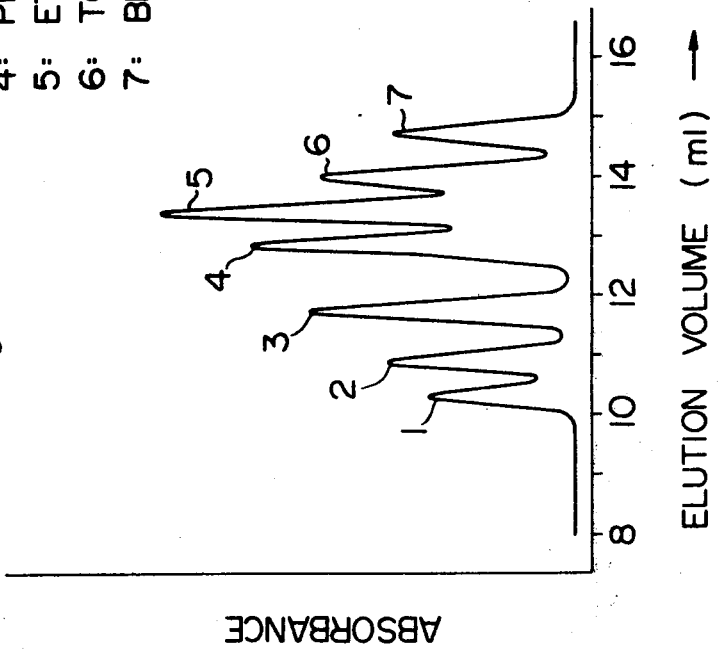

The gel particles were sieved and those having a size of 10 to 20 microns were packed into a stainless steel column having an inside diameter of 8 mm and a length of 500 mm. Alkylbenzenes were separated using this column. The solvent used was tetrahydrofuran, and the flow rate of the sample was 1 ml/min. The temperature was room temperature. The chromatogram obtained is shown in FIG. 4. It is seen from FIG. 4 that this gel copolymer well separated a mixture of benzene, toluene, ethylbenzene, propylbenzene, hexylbenzene, decylbenzene and pentadecylbenzene according to the molecular sizes.

The gel copolymer had an exclusion limit for polystyrene of 500 in tetrahydrofuran.

EXAMPLE 6

A mixture consisting of 57 g of glycidyl methacrylate, 3 g of ethylene glycol dimethacrylate, 65 g of chlorobenzene and 0.3 g of azobisisobutyronitrile was subjected to the same polymerization as in Example 1. A gel copolymer was obtained which was semi-transparent and well swellable with tetrahydrofuran. The content of the remaining epoxy groups was 9.7% by weight calculated as epoxy oxygen which corresponded to 91% of theory based on the amount of component (A) charged.

EXAMPLE 7

A mixture consisting of 15 g of glycidyl methacrylate, 15 g of methyl methacrylate, 30 g of ethylene glycol dimethacrylate, 90 g of n-butyl acetate and 0.3 g of azobisisobutyronitrile was subjected to the same polymerization as in Example 1. Opalescent beads were obtained. The resulting gel copolymer had a swelling ratio in tetrahydrofuran of 5.0 ml/g and a swelling ratio in water of 4.1 ml/g. The gel copolymer had an exclusion limit for polystyrene of $8 \times 10^5$ in tetrahydrofuran.

EXAMPLE 8 (modification with water)

A mixture consisting of 30 g of glycidyl methacrylate, 30 g of ethylene glycol dimethacrylate, 98 g of chlorobenzene and 0.3 g of azobisisobutyronitrile was subjected to aqueous suspension polymerization in the same way as in Example 1 to afford a granular epoxy-containing gel copolymer. The copolymer was sieved, and gel particles having a size of 44 to 75 microns (20 g) were collected and well mixed with 200 ml of a 0.5N aqueous solution of sulfuric acid. The mixture was heated to 90° C. on a water bath, and stirred to hydrolyze the epoxy groups. The product was cooled after 5 hours, and the gel was washed with pure water and then with acetone. No free epoxy group was observed in the resulting gel. This shows that all the epoxy groups contained in the starting gel were converted to 1,2-dihydroxyethyl groups by hydrolysis.

Figure 5:
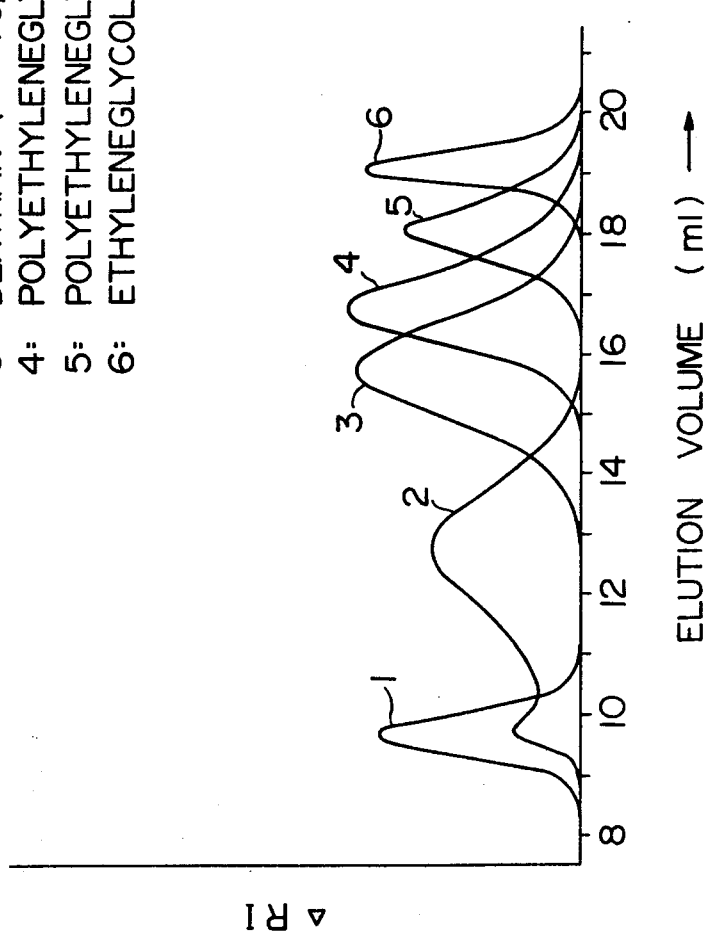

These gel particles were packed into a stainless column having an inside diameter of 8 mm and a length of 500 mm. Using this column, 0.05% aqueous solutions of dextrans of different molecular weights and polyethylene glycol were each separated at 20° C. and a flow rate of 1 ml/min. The resulting chromatogram is shown in FIG. 5. The parenthesized numerals show the molecular weights of the samples.

This gel copolymer had an exclusion limit for dextran of $10^6$ in water.

Adsorption of polyethylene glycol occured when polyethylene glycol was separated in an aqueous medium using the epoxy-containing gel copolymer obtained in Example 1. However, no such adsorption phenomenon occurred when the gel whose epoxy groups were ring-opened by hydrolysis in Example 8 was used. Hence, polyethylene glycol was well separated gel-chromatographically as seen from FIG. 5.

The gel copolymer obtained in Example 8 had high mechanical strength as demonstrated by the following test.

A gel having a size of 15 to 20 microns which was prepared in the same manner as described above was packed into a stainless column having an inside diameter of 8 mm and a length of 500 mm. Pure water was passed through the packed column at a flow rate of 5 ml./min. by means of a pump. However, the gel particles were not deformed, and the original packed state was retained. This shows that these gel particles had mechanical strength which can withstand high-speed flow of eluant. The gel had an exclusion limit for dextran of $10^6$, as stated above. A commercially available homogeneously crosslinked gel such as dextran gel and a polyacrylamide gel having the same exclusion limit was too soft, and when water was passed through a column packed with such a gel at the same rate as above using a pump, the gel particles were deformed, and the original packed state could not be retained.

EXAMPLE 9 (modification with water)

A mixture consisting of 76.5 g of glycidyl methacrylate, 13.5 g of ethylene glycol dimethacrylate, 91.0 g of cyclohexanone, 33.5 g of chlorobenzene and 0.5 g of azobisisobutyronitrile was suspended in a solution of 2.3 g of polyvinyl alcohol (dispersant) in 1.5 liters of water. Aqueous suspension polymerization was performed in the same way as in Example 1 to afford spherical transparent gel particles. The copolymer obtained was sieved to collect gel particles having a size of 44 to 75 microns. Twenty grams of the collected gel particles were well mixed with 200 ml of a 0.3N aqueous solution of sulfuric acid. The mixture was heated to 90° C. on a water bath, and stirred to hydrolyze the epoxy groups. Five hours later, the product was cooled, and filtered. The resulting gel was washed with pure water and then with acetone, and allowed to cool spontaneously.

Figure 6:
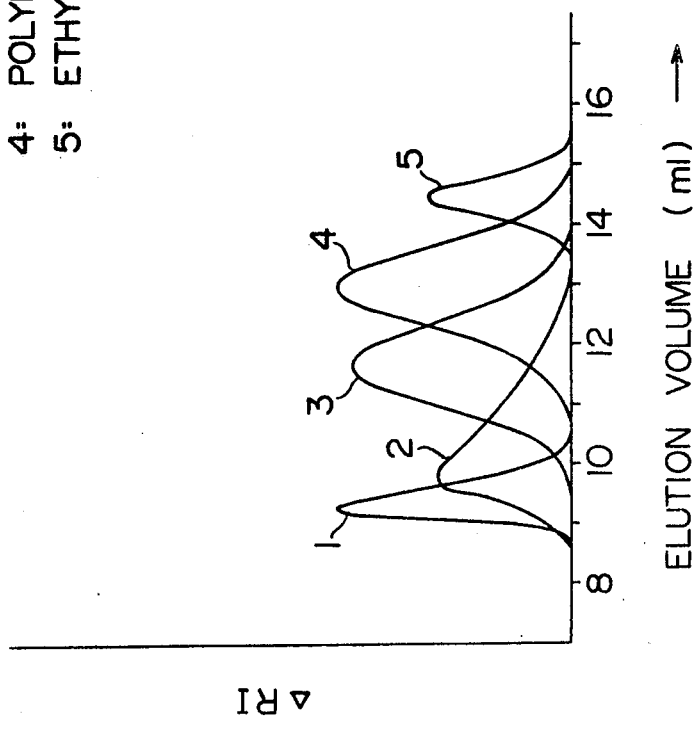

The gel particles were packed into a stainless steel column having an inside diameter of 8 mm and a length of 500 mm. Using this column, 0.5% aqueous solutions of polyethylene gylcols having different molecular weights were separated gel-chromatographically. The eqluant used was pure water, and the flow rate was 1 ml/min. The separation was performed at room temperature. The resulting chromatogram is shown in FIG. 6. The parenthesized numerals show the molecular weights of the samples.

The gel obtained in this example had an exclusion limit for polyethylene glycol of 1500 in water.

EXAMPLE 10 (modification with water)

A mixture consisting of 48 g of glycidyl methacrylate, 13.5 g of ethylene glycol dimethacrylate, 44.1 g of cyclohexanone, 46.3 g of chlorobenzene, and 0.3 g of azobisisobutyronitrile was subjected to aqueous suspension polymerization in the same way as in Example 1 to afford a granular epoxy-containing gel copolymer. The copolymer was sieved, and gel particles having a size of 44 to 75 microns were collected. Twenty grams of the gel particles were well mixed with 200 ml of a 0.3N aqueous solution of sulfuric acid. The mixture was heated to 90° C. on a water bath, and stirred to hydrolyze the epoxy groups. Five hours later, the product was cooled. The gel was washed with pure water and then with acetone, and allowed to cool spontaneously.

Figure 7:
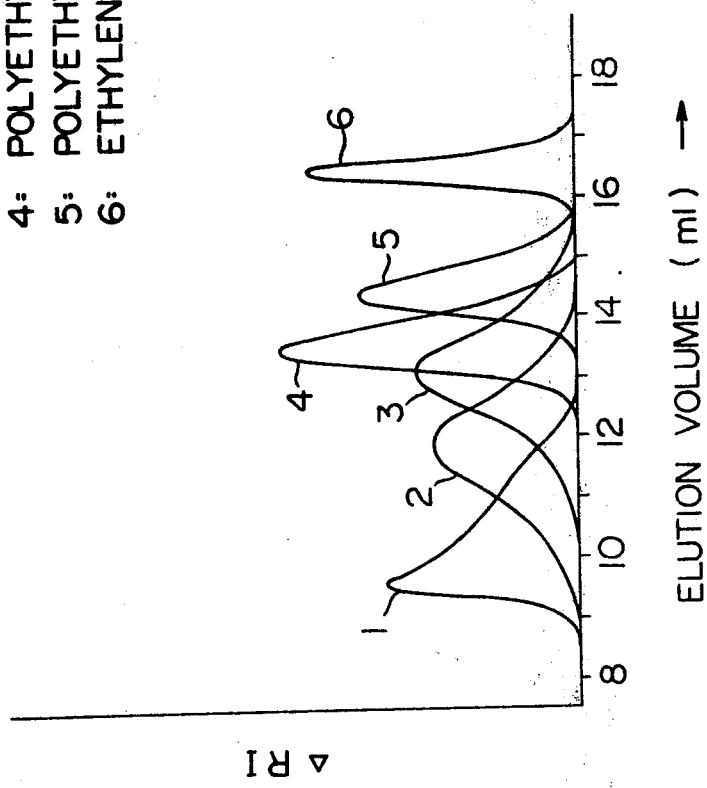

The gel was packed into a stainless steel column having an inside diameter of 8 mm and a length of 500 mm. Using this column, 0.05% aqueous solutions of dextrans having different molecular weights and polyethylene glycol were separated at room temperature using water as an eluant. The flow rate was 1 ml/min. The gel chromatogram obtained is shown in FIG. 7. The parenthesized numerals show the molecular weights of the samples.

This gel copolymer had an exclusion limit for dextran of $1.5 \times 10^5$ in water.

EXAMPLE 11 (modification with water)

Figure 8:
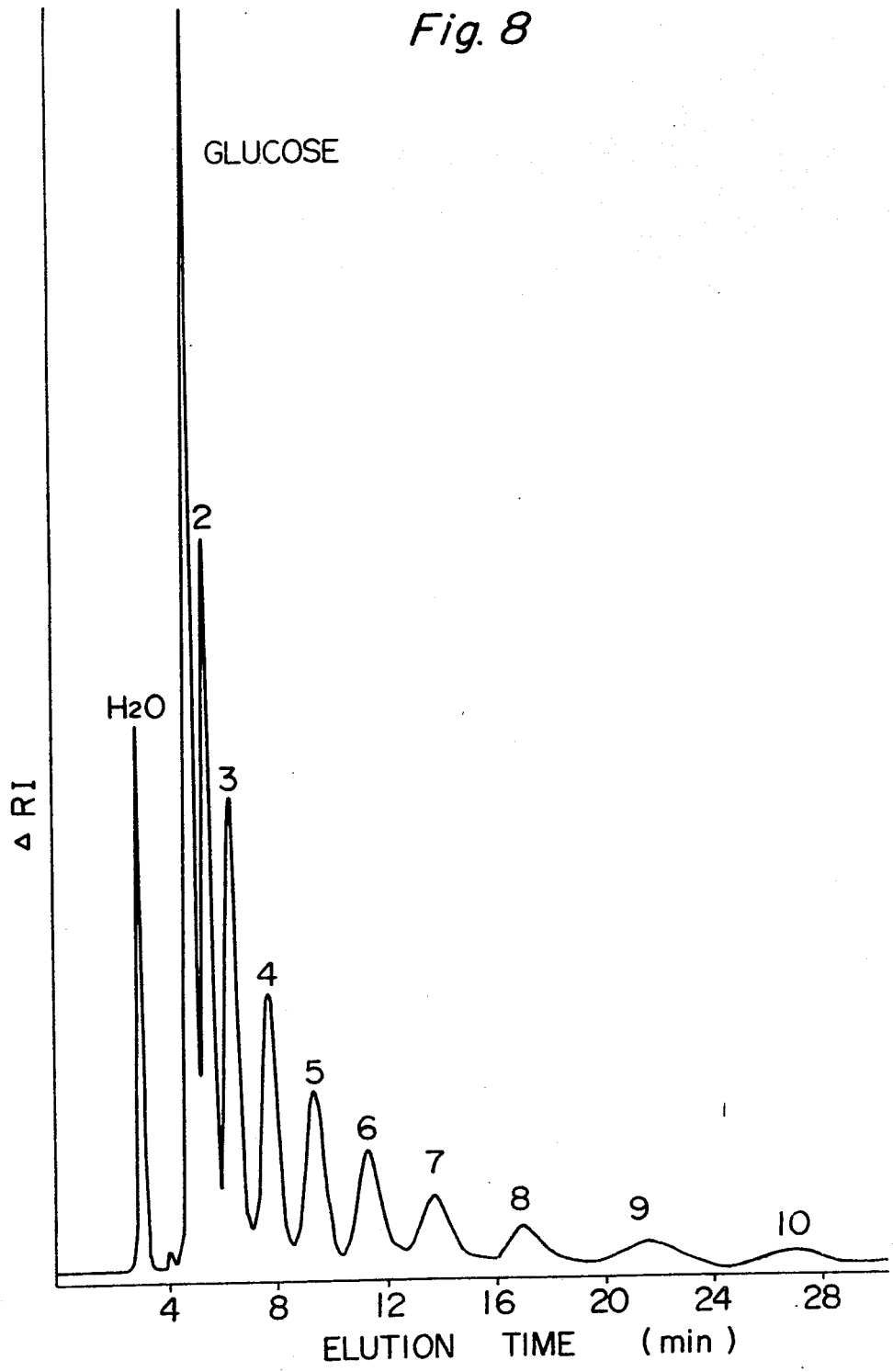

The water-modified gel having a size of 15 to 20 microns which was produced in Example 8 was packed into a stainless steel column having an inside diameter of 4.6 mm and a length of 250 mm. Using this column, oligosaccharides were separated by adsorption chromatography. A 78:22 mixture of acetonitrile/water was used as an eluant, and the flow rate was 0.8 ml/min. The eluted ingredients were detected by a differential refractometer. The separation was performed at room temperature. The chromatogram obtained is shown in FIG. 8. The numerals show the degrees of polymerization of the saccharides. Oligosaccharides (up to decamer) could be separated in 28 minutes.

EXAMPLE 12 (modification with water)

The water-modified gel having a size of 15 to 20 microns which was produced in Example 8 was packed into a stainless steel column having an inside diameter of 4.6 mm and a length of 250 mm. Using this column, a mixture of water-soluble vitamins and caffeine was separated by adsorption chromatography using a 93/7 mixture of an aqueous solution of 0.055M sodium phosphate and 0.045M potassium hydrogen phosphate/methanol as an eluant at a flow rate of 0.8 ml/min. A UV detector was used.

FIG. 9 shows the chromatogram obtained by separating (1) ascorbic acid, (2) orotic acid, (3) pyridoxine hydrochloride, (4) thiamine hydrochloride, (5) nicotinamide, and (6) caffeine.

EXAMPLE 13 (modification with polyethylene glycol)

Twenty-five grams of the gel having a size of 44 to 75 microns which was produced in Example 1 was well mixed with 200 g of polyethylene glycol (average molecular weight 400), and then 1 ml of a boron trifluoride/ethyl ether complex was added as a catalyst. The mixture was heated at 85° C. for 4 hours with stirring. After cooling, the gel was washed with acetone, and filtered to afford a chromatographic filler having polyethylene glycol bonded in it. The epoxy groups contained in the starting gel were not found in the resulting modified product.

EXAMPLE 14 (modification with glycerol)

Twenty-five grams of the gel having a size of 44 to 75 microns which was produced in Example 1 was well mixed with 200 g of glycerol, and then 1 ml of a boron trifluoride/ethyl ether complex was added. With stirring, the mixture was heated at 85° C. for 5 hours. The reaction product was cooled, washed with acetone, and filtered to afford a chromatographic filler having glycerol bonded in it.

What we claim is:

1. A granular filler for liquid chromatography consisting essentially of a porous copolymer of (A) a glycidyl monovinyl ester or a glycidyl monovinyl ether and (B) an alkylene glycol divinyl ester with component (A) being crosslinked by component (B) to form a gel copolymer, the mole ratio of component (A) to component (B) being 10:90 to 90:10, said copolymer containing in its molecule modified groups resulting from the ring-opening reaction of the epoxy groups ascribable to component (A) with a modifying compound selected from the group consisting of water, alkylene glycol, polyalkylene glycol and a triol.

2. The filler of claim 1 wherein component (A) is a glycidyl ester of a monovinyl carboxylic acid containing 3 to 12 carbon atoms or a glycidyl ether of a monovinyl alcohol containing 3 to 12 carbon atoms, and component (B) is a mono- or poly- $C_2$–$C_3$ alkylene glycol diacrylate or dimethacrylate.

3. The filler of claim 1 wherein the mole ratio of component (A) to component (B) is 40:60 to 80:20.

4. The filler of claim 1 wherein up to 50% of component (A) is replaced by a comonomer selected from the group consisting of methyl methacrylate, methyl acrylate and vinyl acetate.

5. The filler of claim 1 wherein the modified groups are 1,2-dihydroxyethyl groups resulting from the ring-opening hydrolysis of the epoxy groups.

6. A process for producing a granular filler for liquid chromatography, which comprises subjecting (A) 10 to 90 mole% of a glycidyl monovinyl ester or a glycidyl monovinyl ether and (B) 90 to 10 mole% of an alkylene glycol divinyl ester to aqueous suspension polymerization in the presence of an inert organic diluent being insoluble in water and capable of dissolving components (A) and (B) thereby to afford particles of a porous gel copolymer having component (A) crosslinked with component (B) and containing in its molecule epoxy groups ascribable to component (A), and reacting the resulting copolymer with a modifying compound selected from the group consisting of water, alkylene glycol, polyalkylene glycol and a triol, to modify the epoxy groups by ring-opening.

7. The process of claim 6 wherein component (A) is a glycidyl ester of a monovinyl carboxylic acid containing 3 to 12 carbon atoms or a glycidyl ether of a monovinyl alcohol containing 3 to 12 carbon atoms, and component (B) is a mono- or poly- $C_2$–$C_3$ alkylene glycol diacrylate or dimethacrylate.

8. The process of claim 6 wherein the mole ratio of component (A) to component (B) is 40:60 to 80:20.

9. The process of claim 6 wherein up to 50% of component (A) is replaced by a comonomer selected from the group consisitng of methyl methacrylate, methyl acrylate and vinyl acetate.

10. The process of claim 6 wherein the amount of the organic diluent is at least 30% by volume based on the total volume of components (A) and (B) and the diluent, and the amount of water is equal to, or more than, the total amount of the organic phase.

11. The process of claim 6 wherein the amount of the organic diluent is 40 to 80% by volume based on the total volume of the components (A) and (B) and the diluent.

12. The process of claim 6 wherein the modifying compound is water, and the epoxy groups are converted to 1,2-dihydroxyethyl groups.

* * * * *

UNITED STATES PATENT AND TRADEMARK OFFICE
CERTIFICATE OF CORRECTION

PATENT NO. : 4,118,347
DATED : October 3, 1978
INVENTOR(S) : SUSUMU ISHIGURO ET AL.

It is certified that error appears in the above-identified patent and that said Letters Patent are hereby corrected as shown below:

```
Column 2, line 21, change "polymerisation" to
     --polymerization--
Column 2, line 25, change "bacause" to --because--
Column 2, line 64, change "polymerisation" to
     --polymerization--
Column 3, line 7, change "orgain" to --organic--
Column 3, line 30, change "intorduction" to --introduction--
Column 6, line 8, change "moleculAr" to --molecular--
Column 6, line 61, change "aquoues" to --aqueous--
Column 7, line 38, change "Gel" to --gel--
Column 7, line 41, change "0.05solutions" to
     --0.5% solutions--
Column 10, line 25, change "0.5%" to --0.05%--
Column 10, line 28, change "eqluant" to --eluant--
Column 12, line 44, in claim 9, change "consisitng" to
     --consisting--
```

Signed and Sealed this

Twenty-seventh Day of March 1979

[SEAL]

Attest:

RUTH C. MASON
Attesting Officer

DONALD W. BANNER
Commissioner of Patents and Trademarks